3,183,216
BORON-CONTAINING POLYMER AND METHOD OF MAKING THE SAME

Murray S. Cohen, Convent Station, Joseph Green, Dover, Sidney I. Karlan, Nutley, and Nathan Mayes, Rockaway, N.J., assignors to Thiokol Chemical Corporation, Bristol, Pa., a corporation of Delaware
No Drawing. Filed Oct. 2, 1959, Ser. No. 844,819
18 Claims. (Cl. 260—83.5)

This invention relates to combustible organoboron compounds and to methods for making them, and relates particularly to monomeric decaborane derivatives of alkynyl alkenates, to polymers prepared therefrom, and to methods of preparing these monomeric and polymeric substances.

Liquid products of this invention may be used as high-energy fuels alone or mixed with other combustible liquids such as compatible hydrocarbon fuels. Solid products of this invention, when mixed with suitable oxidizers such as ammonium, potassium, or sodium perchlorate, ammonium nitrate, etc., yield solid propellants suitable for rocket power plants and other jet propelled devices.

Such propellant mixtures are compounded by a number of techniques known to the art. For example, the mixtures may comprise from 5 to 35 parts by weight of boron containing materials and from 65 to 95 parts by weight of a solid oxidizing agent intimately mixed therewith. In some cases, the propellant may also be made with a curable polymer, for example of the polyurethane, polyester, or polyether types. The cured polymer serves as a binder for mechanical strength and may improve burning characteristics.

Combustible boron compounds, because of their exceptionally high heats of combustion, are useful components of either liquid or solid fuel mixtures.

The organoboron compounds herein described are formed by addition of decaborane, $B_{10}H_{14}$, to the ethynyl ($HC{\equiv}C{-}$) group of an alkynyl alkenate. For example, a preferred class of such compounds has the formula

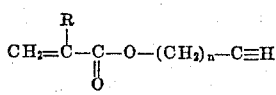

where R is hydrogen or methyl, and $n$ is a small integer, advantageously from 0 to 3 inclusive. Decaborane adds at the triple bond to form compounds believed to correspond with the formula:

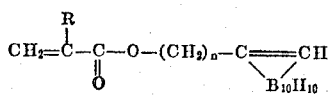

where R and $n$ have the same significance as earlier. The materials can thus be considered decaborane additives of the esters of acrylic acid or methacrylic acid with lower ethynyl alcohols, such as those having from 2 to 5 carbon atoms.

Polymeric products of the monomeric materials just described may be formed by homopolymerization, or copolymerization with other unsaturated materials, particularly vinyl monomers.

The addition of decaborane to the acetylenic linkage is accomplished by means of a nitrogenous or other Lewis base type derivative of decaborane. The latter reacts with ammonia, primary and secondary amines and diamines, and nitriles and dinitriles with the evolution of hydrogen. The reaction with ammonia takes place at 120° C. and is well known in the art. Similar bonding occurs with monoamines as, for example, methylamine, ethylamine, n-propylamine, isopropylamine, n-butylamine, isobutylamine, sec-butylamine, tert-butylamine, n-amylamine, isoamylamine, 2-aminopentane, inter alia. As secondary amines dimethylamine, diethylamine, di-n-propylamine, diisopropylamine, di-n-butylamine, diisobutylamine, and di-sec-butylamine may be given as examples. Diamines include, for example, ethylenediamine, propylenediamine, tri-methylenediamine, 1,3-diaminobutane, 1,4-butanediamine, 1,5-pentanediamine, hexamethylenediamine, and octamethylenediamine. As nitriles and dinitriles, acetonitrile, propionitrile, cyanogen, malononitrile, succinonitrile, glutaronitrile, adiponitrile and β,β'-oxydipropionitrile can be mentioned as examples.

The boron-nitrogen compounds are apparently formed by electron sharing between decaborane and the nitrogen atoms of the compounds described above, with elimination of a hydrogen. The compounds are therefore nitrogen derivatives of $B_{10}H_{14}$, and are herein defined as "nitrogen coordinated decaborane derivatives."

As a preferred example of these derivatives, the coordination compound of decaborane and acetonitrile may be mentioned. Acetonitrile, on refluxing with decaborane, forms a product which appears to be $$(CH_3CN)_2B_{10}H_{12}$$

with hydrogen being evolved as a byproduct. This bis(acetonitrilo) decaborane compound is particularly convenient because of the unexpected ease with which acetonitrile is displaced almost quantitatively in the coupling of the decaborane group to the ethynyl group.

Decaborane, a solid at ordinary temperatures, is generally formed by heating the lower boron hydrides, e.g. by heating diborane to 115–120° C. for 48 hours, or by heating $B_4H_{10}$ to 90–95° C. for 5 hours.

As exemplary of the alkynyl alkenates to which decaborane may be added can be mentioned propargyl acrylate

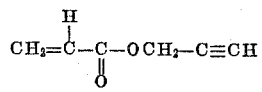

and propargyl methacrylate

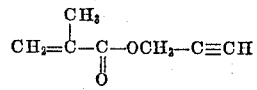

The reaction of such alkynyl alkenates with decaborane proceeds as exemplified below:

(1)    $2CH_3CN + B_{10}H_{14} \rightarrow (CH_3CN)_2B_{10}H_{12} + H_2$ (2)

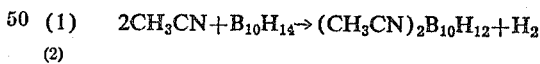
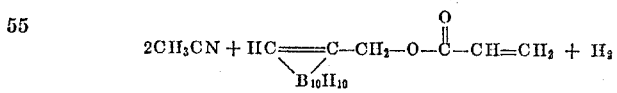

The preparation of propargyl acrylate is described fully in the application of Cohen and Karlan, Serial No. 767,238, filed October 14, 1958. Briefly, the material is made by reacting acrylyl chloride and propargyl alcohol with an acid scavenger present. Propargyl methacrylate can be synthesized by a similar reaction between methacrylyl chloride and propargyl alcohol in the presence of an acid scavenger such as a basic amine and in a solvent such as benzene or toluene.

The decaborane derivatives of the alkynyl alkenates mentioned may be polymerized or copolymerized to form higher molecular weight products. Surprisingly, the large decaborane group does not inhibit such polymerization sterically.

The homopolymerization reaction may be characterized as follows:

(3)

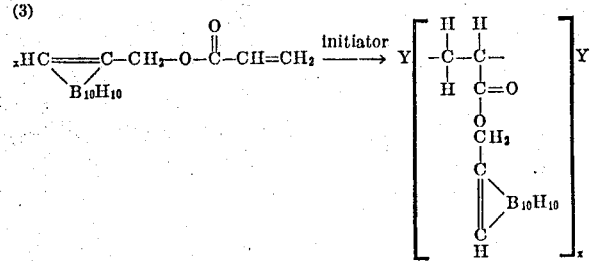

For polymers made according to this invention, $x$ advantageously has integral values such that the molecular weight of the polymers is up to 20,000 or higher, and advantageously is a molecular weight between 500 and 5000. The nature of the radicals Y terminating the polymer chain varies with the conditions of polymerization, as known in the art.

Initiators for the polymerization may be either conventional free radical initiators known to the art such as the peroxides, or conventional ionic polymerization initiators known to the art. These classes may be exemplified by the following compounds: benzoyl peroxide, acetyl peroxide, t-butyl peroxide; substituted azo compounds such as 2,2′-azobisisobutyronitrile; the persulfates; alkali metals such as sodium; and metal halides of the Friedel-Crafts catalyst type, such as aluminum chloride and titanium tetrachloride. The radicals Y of the formula above may be fragments of these initiators, or H— or —OH radicals if the polymerization is carried out in an aqueous phase.

Copolymerization of the decaborane derivatives with other unsaturated monomers proceeds in like fashion under the same catalysis. As monomers suitable for copolymerization, vinyl compounds of all varieties may be used. Styrene, halogenated styrenes such as m-chlorostyrene and p-chlorostyrene, alkyl and alkoxy styrene derivatives such as p-methoxystyrene, and p-methylstyrene can be given as examples of suitable monomers. 1,3-butadiene, methacrylonitrile and 2-vinyl pyridine are also vinyl compounds which can be readily copolymerized with the decaborane derivatives. All the usual techniques of vinyl polymerization, including bulk, solution, suspension, and emulsion systems may be used to form copolymers from the monomers in any desired molar ration.

For purposes of naming the decaborane derivatives described herein, the ring structure formed by addition of decaborane to an acetylenic unsaturation

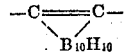

is conveniently indicated by use of the terms "carborane" or "carboranyl." The compound

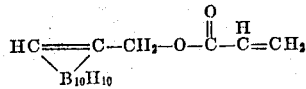

can hence be designated as carboranylmethyl acrylate, for example.

In the following examples, the preparation of this compound, and polymers and copolymers thereof is described as a preferred technique exemplary of the preparation for compounds of the kind herein earlier described.

Example 1

Bis(acetonitrilo) decaborane was prepared by refluxing one mole of decaborane with ten moles of acetonitrile for 10 minutes. Upon cooling, white crystals of bis(acetonitrilo) decaborane were filtered from the system. 20 grams (0.1 mole) of the dried product, 11 grams (0.1 mole) of propargyl acrylate, and 200 milliliters of acetonitrile were stirred together at the reflux temperature for five hours. The resulting solution was filtered and the solvent was evaporated under reduced pressure to a syrupy residue. This residue was fractionated to yield a clear liquid having a boiling point of 105° C./0.5 mm. and an index of refraction of $n_D^{25}$ 1.5378. Examination of its infra-red spectrum revealed characteristic absorptions for a terminal carbon-carbon double bond, an ester group and the decaboranyl group. The material is carboranylmethyl acrylate.

| Analysis showed | Percent C | Percent H | Percent B |
|---|---|---|---|
| Calculated for $C_6H_{16}B_{10}O_2$ | 31.54 | 7.01 | 47.39 |
| Found | 31.49 | 7.64 | 48.3±0.7 |

Example 2

A homopolymer of the carboranylmethyl acrylate was prepared by mixing 1.0 gram of the monomer prepared in Example 1 with 0.003 gram azobisisobutylronitrile in a Pyrex tube which was then degassed by freezing, evacuating, and thawing. The tube was sealed under reduced pressure and then heated in a water bath at 75° C. for 6½ hours. The reaction product had the consistency of a soft gum. It was dissolved in benzene and precipitated as a fine white powder by the slow addition of the benzene solution to a large volume of petroleum ether. The powder softened to a rubbery material at about 270° C. with no decomposition evident below 300° C. The molecular weight of the product was above 1300.

A copolymer of carboranylmethyl acrylate and 1,3-butadiene may be prepared as in the following example.

Example 3

50 parts by weight of an equimolar mixture of carboranylmethyl acrylate and 1,3-butadiene, and 100 parts by weight of water free of air, 0.2 percent by weight of isobutyronitrile catalyst, and 0.5 percent by weight of dioctyl sodium succinate as emulsifier are agitated in a sealed polymerization vessel at 75° centigrade until 70% monomer conversion is achieved (15 to 50 hours depending on batch size). Unreacted butadiene is removed by heating, and the copolymer separated from the heavier aqueous layer. The product is rinsed with water several times and dried under vacuum.

Though specific embodiments have been herein shown and described, it is to be understood they are but illustrative and are not to be construed as limiting on the scope and spirit of the invention.

What is claimed is:

1. A compound of the formula:

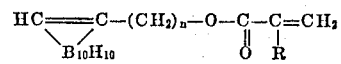

where R is a member of the group consisting of hydrogen and methyl and $n$ has a small integral value.

2. Carboranylmethyl acrylate.

3. Homopolymers of the compound claimed in claim 1.

4. Copolymers of the compound claimed in claim 1 with butadiene.

5. Copolymers of the compound claimed in claim 1 with a vinyl monomer.

6. A method of making carboranylmethyl acrylate which comprises reacting bis(acetonitrilo) decaborane with propargyl acrylate in acetonitrile as a solvent.

7. A method of making the homopolymer of carboranylmethyl acrylate which comprises the step of heating said acrylate in the presence of an addition-polymerization initiator selected from the group consisting of free-radical initiators and ionic initiators.

8. A method of making carboranylmethyl acrylate which comprises reacting one part, on a molar basis, of decaborane with at least two parts, on a molar basis, of acetonitrile, recovering bis(acetonitrilo) decaborane therefrom, and heating said bis(acetonitrilo) decaborane with propargyl acrylate in an inert solvent.

9. A decaborane addition compound according to claim 13 wherein said triple bond is in an ethynyl group of said alkynyl alkenate.

10. A compound according to claim 1 wherein $n$ has a value between 0 and 3 and R is hydrogen.

11. A compound according to claim 1 wherein $n$ has a value between 0 and 3 and R is methyl.

12. An addition compound of decaborane to a triple bond of an alkynyl alkenate, said addition compound containing the carboranyl group

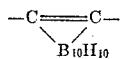

13. A method of adding decaborane to a triple bond of an alkynyl alkenate to form an addition compound containing the carboranyl group

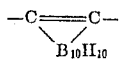

which comprises reacting said alkynyl alkenate with a nitrogen coordinated decaborane derivative.

14. A method as in claim 13 wherein said nitrogen coordinated decaborane derivative is a bis(nitrilo) decaborane.

15. A method as in claim 13 wherein said nitrogen coordinated decaborane derivative is bis(acetonitrilo) decaborane.

16. A method of making carboranylmethyl acrylate which comprises reacting propargyl acrylate with a nitrogen coordinated decaborane derivative.

17. A method as in claim 16 wherein said nitrogen coordinated decaborane derivative is a bis(nitrilo) decaborane.

18. A method as in claim 16 wherein said nitrogen coordinated decaborane derivative is bis-acetonitrilo) decaborane.

No references cited.

LEON J. BERCOVITZ, *Primary Examiner.*

L. D. ROSDOL, I. D. QUARFORTH, *Examiners.*

---

UNITED STATES PATENT OFFICE
CERTIFICATE OF CORRECTION

Patent No. 3,183,216            May 11, 1965

Murray S. Cohen et al.

It is hereby certified that error appears in the above numbered patent requiring correction and that the said Letters Patent should read as corrected below.

Column 5, line 4, for the claim reference numeral "13" read -- 12 --; column 6, line 16, for "bis-acetonitrilo)" read -- bis(acetonitrilo) --.

Signed and sealed this 28th day of September 1965.

(SEAL)
Attest:

ERNEST W. SWIDER            EDWARD J. BRENNER
Attesting Officer            Commissioner of Patents